Patented Aug. 17, 1926.

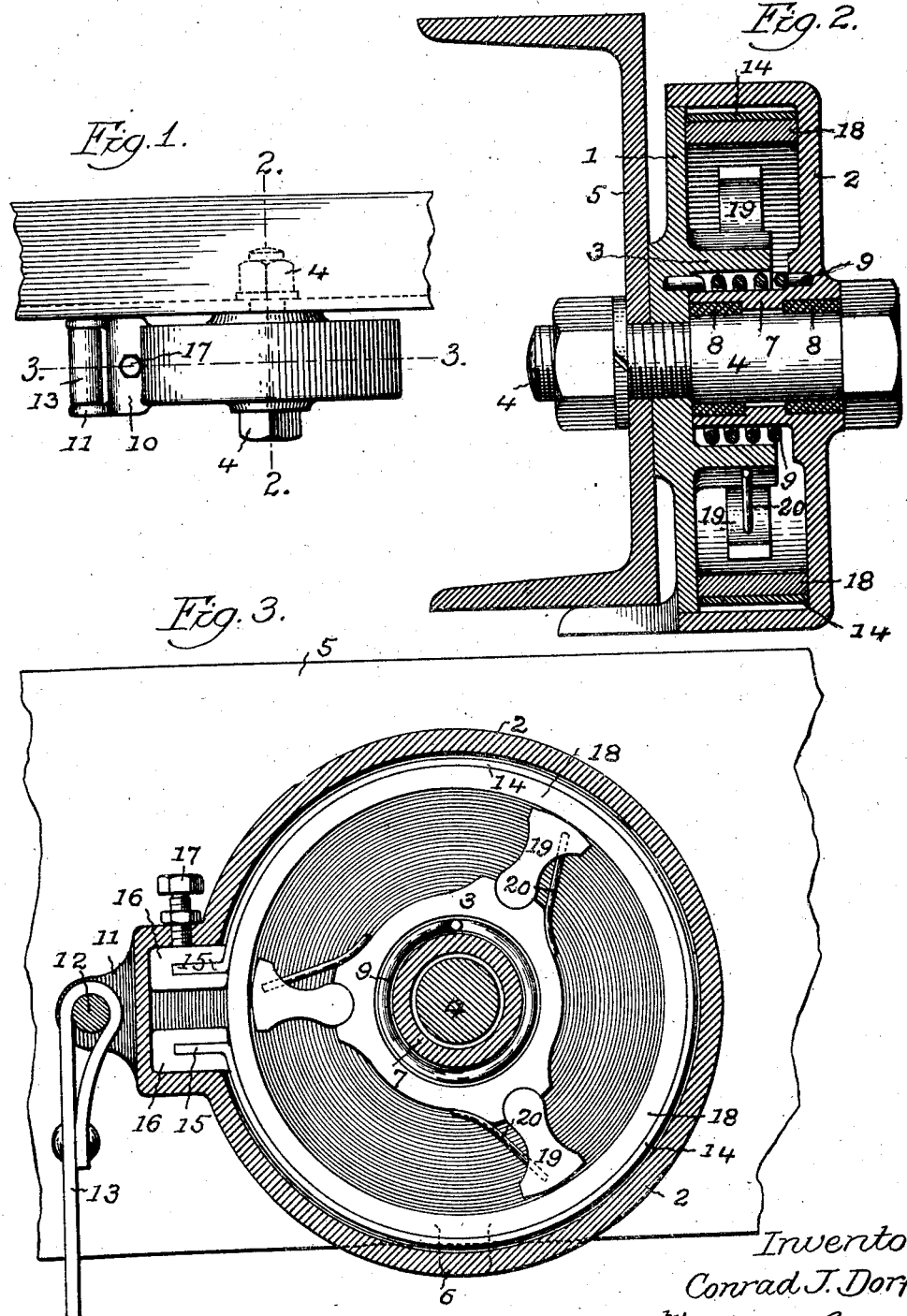

UNITED STATES PATENT OFFICE.

1,596,817

CONRAD J. DORFF, OF CHICAGO, ILLINOIS.

SHOCK ABSORBER.

Application filed July 27, 1925. Serial No. 46,294.

This invention relates to that class of retarding devices for the body springs of motor vehicles, the action of which is to neutralize the tendency to sudden upward surge of the vehicle body under the resiliency of the springs when riding over rough roads and the like, and more especially to that type of such devices in which an annular friction band, in an upward movement of the vehicle body has frictional engagement with an annular ring of the floating type held stationary during such upward movement of the vehicle body, to afford the required frictional retardance, with such ring free to move with the friction band in a downward movement of the vehicle body and permit such movement in a free and unimpeded manner. And the present improvement has for its object:

To provide a structural formation and association of parts whereby a sensitive engagement and substantial holding of the friction ring is automatically attained in a movement of the mechanism in one direction, with a discontinuance of such holding action and frictional retardance in the movement of the part as in the other direction.

To provide a formation of the enclosing housing and associated parts adapted to provide a ready and substantial attachment of the appliance in place upon the vehicle and with which the mechanism is enclosed and protected from dust and other outside influences, all as will hereinafter more fully appear.

In the accompanying drawing:—

Fig. 1 is a plan view of the appliance in place upon a lower rail of a vehicle body.

Fig. 2, is a vertical transverse section on line 2.—2. Fig. 1.

Fig. 3, is a vertical longitudinal section on line 3.—3. Fig. 1.

Like reference numerals indicate like parts in the different views.

In the construction shown in the drawing, the enclosing housing comprises an inner head 1 of a disk form, and an outer shell 2 of a cup form with its circular marginal portion fitting the periphery of the inner head 1 and having a close turning movement thereon. In the present improvement the inner head 1 is formed with a circular flange 3 projecting laterally into the interior of the enclosing housing and adapted to carry the hereinafter described series of toggle members or dogs, and with a central orifice for the attaching bolt 4 by which the device is secured to an under rail 5 of the vehicle body, with said inner head 1 held from a turning movement by the engagement of a fixed lateral lug 6 on its side, engaging beneath an edge of the rail 5 aforesaid.

Near its center the shell 2 is formed with an inwardly extending circular flange or sleeve 7, which has bearing, preferably through a bushing 8, upon the shank portion of the aforesaid attaching bolt 4, with said bolt and the periphery of the inner head 1 constituting the journal support of said outer shell.

In the construction shown, a turning movement of the shell 2 in one direction, is attained by a coiled spring 9 encircling the annular hub 7 aforesaid and arranged between said circular flange 7 and the circular flange 3 of the fixed head 1, with one end attached to the head 1 and the other end attached to the shell 2. The tendency on the part of the spring 9 is to normally maintain the shell 2 and accessories carried thereby in a position for positive operation in an opposite direction by a flexible pull connection now to be described.

At one side of the outer shell 2, a fixed hollow extension 10 is formed for the purpose hereinafter stated, and upon the outer end of the extension 10 a pair of separated lugs 11 are carried with a cross pin 12 extending from lug to lug for the attachment of a looped end of the usual flexible pull 13 which extends down and is attached at its lower end to the frame which supports the body springs of the vehicle.

The flexible connecting means above described is common to the present class of retarding means for effecting a positive turning movement of the outer shell of the appliance in a retarding functioning of the same, and is shown in the drawing as part of an operative structure.

Within the outer shell 2 is arranged an annular friction band 14 of the split type, having out turned ends 15 which in turn carry shoes 16 in spaced relation, with one shoe having bearing against a lower wall of the hollow shell extension 10 aforesaid, while the other shoe receives adjustment to and from the first mentioned shoe, for increasing or decreasing the tension of the friction band 14, by an adjusting bolt 17 turning in a top wall of the hollow extension 10.

In frictional engagement with the inner face of the friction band 14, a loose or floating annular member or ring is arranged. Said ring is of the endless band form and is adapted in the active or retarding operation of the appliance, to be engaged and held stationary along with the fixed head 1 of the appliance by a plurality of intermediate gripping members formed and arranged as follows:

The perimeter of the annular hub 3 of the inner head 1 is formed with a series of bearing sockets in which a series of toggle members or dogs 19 are stepped at their inner ends. The outer ends or faces of the toggle members 19 are of a cam form and are arranged in operative relation to the inner face of the loose or floating ring 18 aforesaid, with said cam formed ends so positioned that a turning movement of said ring in one direction the toggle members 19 will be pushed aside to permit of the free movement of the ring, while a turning movement of the ring 18 in the opposite direction will cause the cam formed end of the toggle members 19 to come into forcible engagement with the inner face of the ring 18 to lock the same against turning movement in the last mentioned direction. The movement in the last mentioned direction takes place as the vehicle body moves upward under the influence of its supporting springs, and provides the desired frictional retardance to such upward movement of said body, in that with the floating ring 18 held from a turning movement, and the outer shell 2 and friction band 14 having a turning movement in unison with the upward movement of the vehicle body, the required frictional effect is produced between said friction band 14 and ring 18.

With the described construction, light springs 20 are associated with the toggle members 19 to hold the cam formed ends of the same in close operative relation to the inner face of the floating ring 18.

Having thus fully described my invention, what I claim and desire to secure by Letters Patent, is:—

1. In a retarding mechanism of the type described, the combination of a fixed head of a disk form having a central attaching orifice and a circular bearing flange concentric with said orifice, said flange being formed with bearing sockets in its perimeter, an outer revoluble frame having a rim portion in bearing contact with the periphery of the fixed head and a central bearing sleeve, a central bolt constituting an attaching means for the aforesaid fixed head and a journal for the aforesaid revoluble shell, a split annular friction band arranged within said shell with its end portions adjustably attached to a rim portion of said shell, a loose friction ring arranged inside of said friction band, a one way clutch connection carried by the aforesaid circular flange of the fixed head and having operative engagement with the inner surface of the loose ring, the same comprising toggle links journalled at their inner ends in the sockets of the aforesaid circular flange with their outer ends formed with cam faces adapted for clutch engagement with the inner surface of the loose ring aforesaid, and means for imparting a turning movement to the revoluble shell in a movement of the appliance as a whole in one direction.

2. In a retarding mechanism of the type described, the combination of a fixed head of a disk form having a central attaching orifice and a circular bearing flange concentric with said orifice, said flange being formed with bearing sockets in its perimeter, an outer revoluble frame having a rim portion in bearing contact with the periphery of the fixed head and a central bearing sleeve, a central bolt constituting an attaching means for the aforesaid fixed head and a journal for the aforesaid revoluble shell, a split annular friction band arranged within said shell with its end portions adjustably attached to a rim portion of said shell, a loose friction ring arranged inside of said friction band, a one way clutch connection carried by the circular flange of the said fixed head and having operative engagement with the inner surface of the loose ring, the same comprising toggle links journalled at their inner ends in the sockets of the aforesaid circular flange with their outer ends formed with cam faces adapted for clutch engagement with the inner surface of the loose ring aforesaid, an intermediate spring connecting the fixed head and revoluble shell for imparting a turning movement to the shell in a reverse direction to the one just stated, and a flexible connection extending from a side of the shell to a part of the vehicle upon which the body springs are mounted.

Signed at Chicago, Illinois, this 25th day of July 1925.

CONRAD J. DORFF.